United States Patent
Wu

(10) Patent No.: US 9,537,782 B2
(45) Date of Patent: Jan. 3, 2017

(54) METHOD AND DEVICE FOR DYNAMICALLY ADJUSTING WAITING TIME OF UPLINK MACRO DIVERSITY COMBINING

(71) Applicant: ZTE Corporation, Shenzhen (CN)

(72) Inventor: Mintian Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/436,176

(22) PCT Filed: Sep. 18, 2013

(86) PCT No.: PCT/CN2013/083777
§ 371 (c)(1),
(2) Date: Apr. 16, 2015

(87) PCT Pub. No.: WO2014/059845
PCT Pub. Date: Apr. 24, 2014

(65) Prior Publication Data
US 2015/0281103 A1    Oct. 1, 2015

(30) Foreign Application Priority Data
Oct. 16, 2012  (CN) .......................... 2012 1 0393784

(51) Int. Cl.
*H04L 12/841*  (2013.01)
*H04L 12/64*   (2006.01)
(Continued)

(52) U.S. Cl.
CPC .............. *H04L 47/28* (2013.01); *H04B 7/022* (2013.01); *H04L 12/6418* (2013.01);
(Continued)

(58) Field of Classification Search
CPC .................. H04W 36/00–36/385; H04B 7/022
See application file for complete search history.

(56) References Cited

U.S. PATENT DOCUMENTS

| | | |
|---|---|---|
| 2006/0159016 A1 | 7/2006 | Sagfors et al. |
| 2007/0086457 A1 | 4/2007 | Rune et al. |
| 2009/0219886 A1* | 9/2009 | Rune ..................... H04W 36/18 370/331 |

FOREIGN PATENT DOCUMENTS

| | | |
|---|---|---|
| CN | 1607844 A | 4/2005 |
| CN | 1842050 A | 10/2006 |

(Continued)

OTHER PUBLICATIONS

International Search Report for corresponding application PCT/CN2013/083777 filed Sep. 18, 2013; Mail date Dec. 26, 2013.
(Continued)

*Primary Examiner* — Pao Sinkantarakorn
(74) *Attorney, Agent, or Firm* — Cantor Colburn LLP

(57) ABSTRACT

Provided are a method and device for dynamically adjusting waiting time of uplink macro diversity combining. In the embodiments of the disclosure, in accordance with the real-time transmission condition and time delay of each link of the current macro diversity, as well as the specific time for DCH FP data frames having the same CFN from different links to arrive at an RNC, the RNC dynamically increases or reduces the waiting time of macro diversity combining, thereby improving the processing efficiency and accuracy rate of macro diversity combining.

20 Claims, 3 Drawing Sheets

(51) Int. Cl.
      *H04B 7/02*           (2006.01)
      *H04L 12/801*      (2013.01)
      *H04W 72/04*       (2009.01)
      *H04W 88/12*       (2009.01)

(52) U.S. Cl.
      CPC ......... *H04L 47/18* (2013.01); *H04W 72/0413* (2013.01); *H04W 72/0446* (2013.01); *H04W 88/12* (2013.01)

(56) References Cited

FOREIGN PATENT DOCUMENTS

| | | | |
|---|---|---|---|
| EP | 2187670 | A1 | 5/2010 |
| WO | 2003096734 | A1 | 11/2003 |
| WO | 2005062654 | A1 | 7/2005 |
| WO | 2007127543 | A2 | 11/2007 |

OTHER PUBLICATIONS

English Translation of Abstract of CN1607844A.
Papen W Ed—Institute of Electrical and Electronics Engineers: "Improved Soft Handoff and Macro-Diversity for Mobile Radio" 9 Communications—Gateway to Globalization. Proceedings of the International Conference on Communications. Seattle 9 Jun. 18-22, 1995; 9 [Proceedings of the International Conference on Communications (ICC)] New York9 IEEE9 us9 vol. 39 Jun. 18, 1995 (Jun. 18, 1995)9 pages 1828-1833 9 XP000535060 9.
EP Search Report for PCT/CN2013/083777, filed on Sep. 18, 2013. The search report was issued on Sep. 30, 2015.

\* cited by examiner

METHOD AND DEVICE FOR DYNAMICALLY ADJUSTING WAITING TIME OF UPLINK MACRO DIVERSITY COMBINING

TECHNICAL FIELD

The disclosure relates to the technical field of communications, in particular to a method and device for dynamically adjusting waiting time of uplink macro diversity combining in a wideband code division multiple access system (Wideband Code Division Multiple Access System, referred to as WCDMA), and more particularly, relates to configuration and adjustment of waiting time of uplink data packet combining under a macro diversity condition.

BACKGROUND

A WCDMA system is composed of the following network elements: User Equipment (UE), an UMTS Terrestrial Radio Access Network (UTRAN) and a Core Network (CN). The UTRAN is responsible for functions relevant to wireless side processing. The CN is responsible for performing voice and data exchange with an external network.

A macro diversity function of the WCDMA is directly relevant to soft handover. When UE is in an inter-cell handover state, the UE may need to communicate with a plurality of base stations (Node b) participating in handover at the same time, and combine signals sent from these base stations so as to improve the signal quality of uplink and downlink to ensure not to lose data in the handover process. This technology is referred to as macro diversity which enables communications not to be affected when the UE is moving.

Generally, under a condition of macro diversity, the same data packet sent by the UE is sent to a radio network controller (Radio Network Control, referred to as RNC) respectively passing two or more base stations. The RNC is responsible for determining the handover of the UE, completing data combining, and sending the signal to a core network.

In the specific implementation of the RNC performing macro diversity combining, various information in an uplink FP (Frame Protocol) data frame would be received together with a data block, then it is judged when storing the data that if FP frames with the same connection frame number (Connection Frame Number, referred to as CFN) are existed, then combining processing is performed. The data blocks with a correct cyclic redundancy check indicator (Cyclic Redundancy Check Indicator, referred to as CRCI) are put to corresponding positions. If none of the data blocks have correct CRCI, then data blocks with small quality estimate values (Quality Estimate QE) are put to the corresponding positions. When a medium access control (Medium Access Control, referred to as MAC) layer is performing uplink scheduling, data contents of FP frames are acquired according to an ascending order of the CFN, and are put to corresponding logical channels after demultiplexing and decryption.

However, since Iub transmission path distances and service load conditions of different stations are different, a time delay difference inevitably exists in a macro diversity state when data of various links arrives at the RNC. However, when a MAC is performing uplink scheduling, all data of all links needs to be completely collected for a certain CFN point before further processing can be performed, and this introduces the concept of macro diversity combining waiting time.

If the data of all links are not completely collected when a preset waiting time of macro diversity combining expires after data of a first link arrives, then it is judged that the waiting of macro diversity combining times out, and at this time subsequent processing may be performed on combined data of other links. However, in practical applications, in one aspect, in order to collect all the data of all links, waiting time of macro diversity combining theoretically needs to be configured to be large enough; while in the other aspect, in order to improve data processing performance, the waiting time of macro diversity combining also needs to be configured to be relatively small. In order to solve this problem, a method for dynamically adjusting the waiting time of uplink macro diversity combining is urgently needed, so that during the operation, a system can automatically select a suitable waiting time of macro diversity combining to effectively improve the performance of the system.

SUMMARY

In view of this, the embodiments of the disclosure provide a method and device for dynamically adjusting waiting time of uplink macro diversity combining.

In order to implement the target of the embodiments of the disclosure, the following technical solutions are adopted for implementation.

A method for dynamically adjusting waiting time of uplink macro diversity combining is provided, including:

acquiring an uplink dedicated channel (DCH) frame protocol (FP) data frame from a current link;

judging whether the acquired FP data frame is a data frame uncombined due to expiration of the waiting time of the macro diversity combining, and if the FP data frame is a data frame uncombined due to the expiration of the waiting time, then further judging whether a radio network controller (RNC) is in a macro diversity combining waiting time expired state at a moment of receiving the FP data frame, and if the RNC is in the macro diversity combining waiting time expired state at the moment of receiving the FP data frame, then recording a connection frame number (CFN) and a receiving moment of the FP data frame, performing cyclic traversal on FP data frames of the same DCH from other links, searching for uplink receiving moments of FP data frames which have the same CFN and are stored in uplink cache of said other links, calculating difference values between each of the found uplink receiving moments and the recorded receiving moment, and updating a greatest difference value in the calculated difference values to serve as a new waiting time of the macro diversity combining.

In an example embodiment, after updating the greatest difference value to serve as the new waiting time of the macro diversity combining, the method further includes:

discarding the FP data frame, and updating a current RNC link state to be a macro diversity waiting timing unexpired state.

In an example embodiment, in a processing flow, if the acquired FP data frame is not a data frame uncombined due to the expiration of the waiting time of the macro diversity combining, then the FP data frame is delivered to a judging flow for subsequent processing; and if the acquired FP data frame is a data frame uncombined due to the expiration of the waiting time of the macro diversity combining, but the RNC is not in the macro diversity combining waiting time expired state at the moment of receiving the FP data frame, then the FP data frame is discarded.

In an example embodiment, the method further includes a judging flow, and the judging flow comprises:

acquiring an uplink DCH FP data frame having a certain CFN delivered from a processing flow, and judging whether it is the first time to receive an FP data frame having this CFN, and if it is the first time to receive an FP data frame having this CFN, then recording a moment for receiving the FP data frame for the first time, otherwise calculating a time difference between a current receiving moment and the moment for receiving the FP data frame for the first time; and judging whether all DCH FP data frames having the CFN from all links in the uplink macro diversity have been completely collected, and if all the DCH FP data frames having the CFN from all the links in the uplink macro diversity have been completely collected, then updating a time difference between a moment for receiving a DCH FP data frame for the last time and a moment for receiving a DCH FP data frame for the first time to serve as a new waiting time of the macro diversity combining.

In an example embodiment, the judging flow further includes:

if the DCH FP data frames having the CFN from all the links in the uplink macro diversity are not completely collected, then continuing waiting for FP data frames having the CFN from other links.

In an example embodiment, the judging flow further includes:

if data of all the links are not completely collected when the current waiting time of the macro diversity combining expires after the first uplink DCH FP data frame having a certain CFN arrives, then marking that an RNC link has been in a macro diversity combining waiting time expired state.

A device for dynamically adjusting waiting time of uplink macro diversity combining is provided, including:

an acquiring component, configured to acquire an uplink DCH FP data frame from a current link; and a processing component, configured to judge whether the acquired FP data frame is a data frame uncombined due to expiration of the waiting time of the macro diversity combining, and if the FP data frame is a data frame uncombined due to the expiration of the waiting time, then further judge whether an RNC is in a macro diversity combining waiting time expired state at a moment of receiving the FP data frame, and if the RNC is in the macro diversity combining waiting time expired state at the moment of receiving the FP data frame, then record a connection frame number (CFN) and a receiving moment of the FP data frame, and perform cyclic traversal on FP data frames of the same DCH from other links, search for uplink receiving moments of FP data frames which have the same CFN and are stored in uplink cache of said other links, and calculate difference values between each of the found uplink receiving moments and the recorded receiving moment, and update a greatest difference value in the calculated difference values to serve as a new waiting time of the macro diversity combining.

In an example embodiment, the processing component is further configured to discard the FP data frame after updating the greatest difference value to serve as the new waiting time of the macro diversity combining, and update a current RNC link state to be a macro diversity waiting timing unexpired state.

In an example embodiment, if the acquired FP data frame is not a data frame uncombined due to the expiration of the waiting time of the macro diversity combining, the processing component is further configured to directly deliver the frame to a judging component for subsequent processing; and if the acquired FP data frame is a data frame uncombined due to the expiration of the waiting time of the macro diversity combining, but the RNC is not in the macro diversity combining waiting time expired state at the moment of receiving the FP data frame, then the processing component is further configured to discard the FP data frame.

In an example embodiment, the device for dynamically adjusting waiting time of uplink macro diversity combining further includes:

a judging component, configured to acquire an uplink DCH FP data frame having a certain CFN delivered from the processing component and judge whether it is the first time to receive an FP data frame having this CFN, and if it is the first time to receive an FP data frame having this CFN, then record a moment for receiving the FP data frame for the first time, otherwise calculate a time difference between a current receiving moment and the moment for receiving the FP data frame for the first time; and further configured to judge whether all DCH FP data frames having the CFN from all links in the uplink macro diversity have been completely collected, and if all the DCH FP data frames having the CFN from all the links in the uplink macro diversity have been completely collected, then update a time difference between a moment for receiving a DCH FP data frame for the last time and a moment for receiving a DCH FP data frame for the first time to serve as a new waiting time of the macro diversity combining.

In an example embodiment, if the DCH FP data frames having the CFN from all the links in the uplink macro diversity are not completely collected, the judging component is further configured to continue waiting for FP data frames having the CFN from other links.

In an example embodiment, if data of all the links are not completely collected when the current waiting time of the macro diversity combining expires after the first uplink DCH FP data frame having a certain CFN arrives, the judging component is further configured to mark that an RNC link has been in a macro diversity combining waiting time expired state.

It can be seen from the technical solution of the embodiments of the disclosure that the waiting time of uplink macro diversity combining obtained by using the embodiments of the disclosure may be self-adaptively and dynamically adjusted according to jitter and time delay conditions, which solves the problems that the existing waiting time of macro diversity is set to be a fixed single value and integrity of combined data of macro diversity and quick completion of the entire flow cannot be both satisfied.

Figure 1:
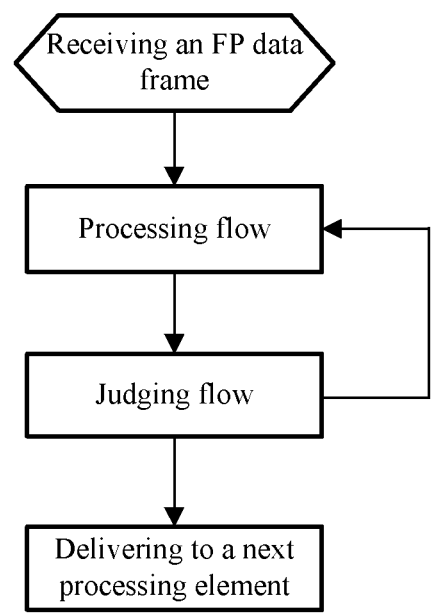
FIG. 1 is a flow schematic diagram of a relationship between a processing flow and a judging flow during dynamically adjusting waiting time of uplink macro diversity combining in an embodiment of the disclosure.

Implementation of objects, functional features and advantages effects of the disclosure will be further illustrated in combination with specific embodiments and appended drawings.

DESCRIPTION OF EMBODIMENTS

The technical solution of the disclosure is described below with reference to the accompanying drawings and embodiments in detail, so as to enable the skilled personnel in the field to better understand the disclosure and implement; but the embodiments are not intended to limit the disclosure.

An embodiment of the disclosure provides a method for dynamically updating waiting time of uplink macro diversity combining in a third generation mobile communication system. Core contents of the embodiment of the disclosure include: in accordance with the real-time transmission condition and time delay of each link of the current macro diversity, as well as the specific time for DCH FP data frames having the same CFN from different links to arrive at an RNC, the RNC dynamically increases or reduces the waiting time of macro diversity combining, thereby improving the processing efficiency and accuracy rate of macro diversity combining.

In an example embodiment, a method for dynamically adjusting waiting time of uplink macro diversity combining includes the following Steps S100 and S101.

In S100, an uplink dedicated channel DCH FP data frame from a current link is acquired.

In S101, whether the acquired FP data frame is a data frame uncombined due to the expiration of the waiting time of the macro diversity combining is judged, and if the FP data frame is a data frame uncombined due to the expiration of the waiting time, then whether an RNC is in a macro diversity combining waiting time expired state at the moment of receiving the FP data frame is further judged, and if the RNC is in the macro diversity combining waiting time expired state at the moment of receiving the FP data frame, then a CFN and a receiving moment of the FP data frame are recorded, and cyclic traversal is performed on FP data frames of the same DCH from other links, uplink receiving moments of FP data frames which have the same CFN and are stored in uplink cache of said other links are searched, difference values between each of the found uplink receiving moments and the recorded receiving moment are calculated, and a greatest difference value in the calculated difference values is updated to serve as a new waiting time of the macro diversity combining.

In the embodiment of the disclosure, after updating the greatest difference value to serve as the new waiting time of the macro diversity combining, the method further includes the following Steps S102.

In S102, the FP data frame is discarded, and a current RNC link state is updated to be a macro diversity waiting timing unexpired state.

In Step S101 of the processing flow, if the acquired FP data frame is not a data frame uncombined due to the expiration of the waiting time of the macro diversity combining, then the frame is directly delivered to a judging flow for subsequent processing; and if the acquired FP data frame is a data frame uncombined due to the expiration of the waiting time of the macro diversity combining, but the RNC is not in a macro diversity combining waiting time expired state at the moment of receiving the FP data frame, then the frame is discarded.

The method for dynamically adjusting waiting time of uplink macro diversity combining provided in an embodiment of the disclosure further includes a judging flow, and the judging flow includes the following Steps S200 to S201.

In S200, an uplink DCH FP data frame having a certain CFN delivered from the processing flow is acquired, and whether it is the first time to receive an FP data frame having this CFN is judged, and if it is the first time to receive an FP data frame having this CFN, then a moment for receiving the FP data frame for the first time is recorded, otherwise a time difference between the current receiving moment and the moment for receiving the FP data frame for the first time is calculated.

In S201, whether all DCH FP data frames having the CFN from all links in the uplink macro diversity have been completely collected is judged, and if all the DCH FP data frames having the CFN from all the links in the uplink macro diversity have been completely collected, then a time difference between a moment for receiving a DCH FP data frame for the last time and a moment for receiving a DCH FP data frame for the first time is updated to serve as a new waiting time of the macro diversity combining.

In an example embodiment, the judging flow further includes the following Step S203.

In S203, if the DCH FP data frames having the CFN from all the links in the uplink macro diversity are not completely collected, then continue waiting for FP data frames having the CFN from other links.

In an example embodiment, the judging flow further includes the following Step S204.

In S204, if data of all the links are not completely collected when the current waiting time of the macro diversity combining expires after the first uplink DCH FP data frame having a certain CFN arrives, then an RNC link is marked to be in a macro diversity combining waiting time expired state.

The method for dynamically adjusting waiting time of uplink macro diversity combining provided in the present embodiment calculates appropriate waiting time in real time according to jitter and time delay conditions of various transmission links. The embodiment can not only guarantee that an uplink macro diversity can collect all DCH FP data of all links for processing as much as possible, but also can make the waiting time shortest, thereby accelerating the completion of a signalling flow and improving the performance of the system.

In an example embodiment, the method provided in the embodiment of the disclosure specifically includes:

the specific implementation process may be further divided into two parts, i.e., a judging flow and a processing flow. The judging flow judges whether a link has been in a macro diversity combining waiting time expired state according to a received certain data frame. The processing flow performs different processing on the frame according to the judgement of a previous frame when a next frame arrives. After completion of the processing flow, the judging process is entered for another round of judgement. The two flows are in a mutually recursive relationship.

1. Steps of the Judging Flow are Described as Follows.

In Step 1, an uplink FP data frame having a certain CFN delivered after a processing process is received, and whether it is the first time to receive an FP data frame having this CFN is judged, and if it is the first time to receive an FP data frame having this CFN, then the moment for receiving the FP data frame for the first time is recorded, otherwise, a time difference between the current receiving moment and the moment for receiving the FP data frame for the first time is calculated.

In Step 2, whether all DCH FP data frames having the CFN from all links in the uplink macro diversity have been completely collected is judged, and if all the DCH FP data frames having the CFN from all the links in the uplink macro diversity have been completely collected, then a time difference between a moment for receiving the DCH FP data frame for the last time and the moment for receiving the DCH FP data frame for the first time is updated to serve as a new waiting time of the macro diversity combining.

In Step 3, if all DCH FP data frames having the CFN from all links in the uplink macro diversity have not been completely collected, then waits for FP data having the CFN from other links and no processing is performed.

In Step 4, if data of all the links are not completely collected when the current waiting time of the macro diversity combining expires after the first uplink DCH FP data frame having a certain CFN arrives, then an RNC link is judged to have been in a macro diversity combining waiting time expired state.

After judging whether the waiting time of macro diversity combining for a link expires, data frames having been received and combined would be sent to a next processing component, and the processing flow would perform different processing according to whether the waiting time of macro diversity combining for a link expires when a next data frame arrives.

2. Steps of the Processing Flow are Described as Follows.

In Step 1, a user receives a next data frame and judges whether the frame is a data frame previously uncombined due to expiration of waiting time, otherwise, the frame is directly delivered to the judging flow for subsequent processing.

In Step 2, if the frame is a data frame previously uncombined due to expiration of waiting time, then processing is performed according to whether an RNC link is in a macro diversity combining waiting time expired state, and if the RNC link is not in the waiting time expired state, then the frame is simply discarded and not processed.

In Step 3, if the frame is a data frame previously uncombined due to expiration of waiting time, and now the RNC link is in the macro diversity combining waiting time expired state, then the CFN of the frame and a receiving moment of the frame are recorded. A cyclic traversal is performed on FP data frames of the same DCH from other links, and uplink receiving moments of the data having the CFN saved in uplink cache of said other links are searched, and difference values between each of the receiving moments and the receiving moment recorded just now is calculated, and a greatest difference value in the calculated difference values serves as a new waiting time of the macro diversity combining.

In Step 4, the frame is discarded, and a current link state is updated to be a macro diversity waiting timing unexpired state.

Figure 2:
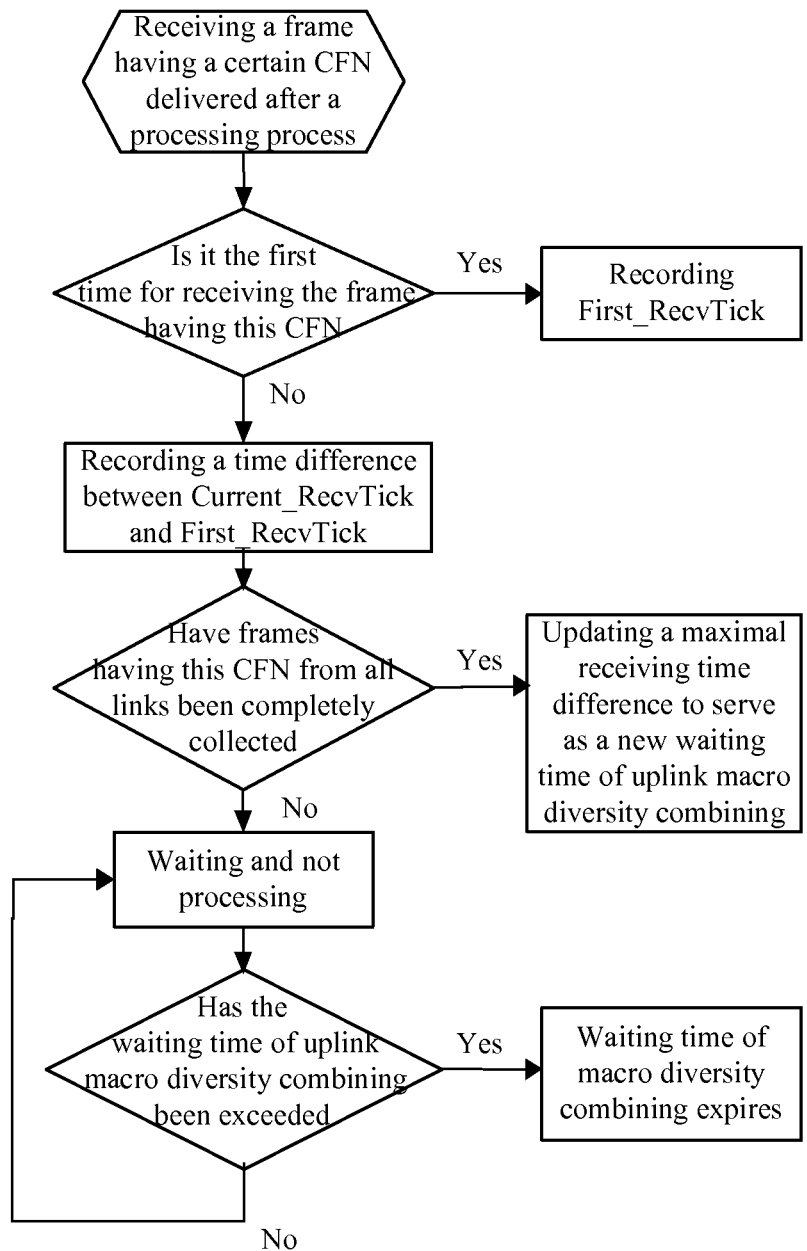
FIG. 2 is a specific flow schematic diagram of the judging flow in an embodiment of the disclosure.
Figure 3:
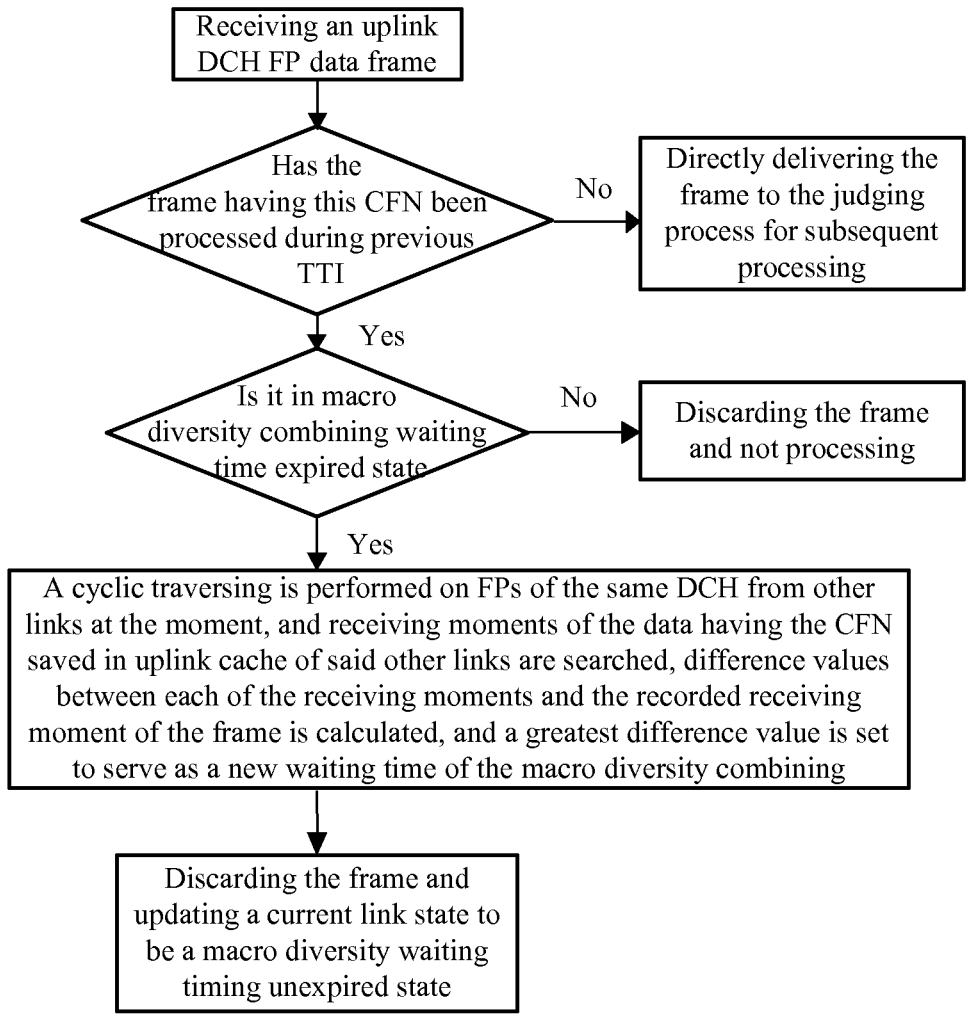
FIG. 3 is a specific flow schematic diagram of the processing flow in an embodiment of the disclosure.

With reference to FIG. 1, it shows an overall operation flow of the processing flow and the judging flow, including:

the first step, an FP data frame is received;

the second step, a processing flow is entered, and now a judgement result of a previous judging flow is needed, wherein the specific implementation flow of the processing flow may refer to what is shown in FIG. 3;

the third step, the data frame after the processing flow enters the judging flow, and the judging result would be used for the processing flow of a next data frame, and the specific implementation flow of the judging flow may refer to what is shown in FIG. 2; and the fourth step, the data frame after the judging flow may be delivered to a next processing element.

With reference to FIG. 2, the judging flow specifically includes the following processing steps.

The first step, a first uplink FP data frame having a certain CFN delivered by a processing process during a macro diversity is received, and whether it is the first time for receiving the frame having the CFN is judged, and if it is the first time to receive an FP data frame having this CFN, then the moment for receiving the FP data frame for the first time is recorded as First_RecvTick, otherwise, the receiving moment of the FP data frame is recorded as Current_RecvTick, and a time difference between the Current_RecvTick and the First_RecvTick is calculated:

RecvTickOffset=Current_RecvTick−First_RecvTick.

The second step, when MAC uplink scheduling processing is performed, with regard to a certain CFN, whether FP data frames having this CFN from all links in an uplink macro diversity are completely collected is judged, and if they are completely collected, then a time difference between receiving the data frame for the last time and receiving the data frame for the first time is updated, that is to say, a maximal value MaxRecvTickOffset in RecvTickOffsets of the same CFN serves as a new waiting time of the macro diversity combining New_UIMacroCombWaitTime.

It is noted that in order to prevent frequent changes of macro diversity combining time, in the present embodiment, a time value obtained by performing rounding up on New_UIMacroCombWaitTime according to 5 ms would serve as the subsequent waiting time of the uplink macro diversity combining.

The third step, after the first uplink DCH FP data frame arrives, if uplink DCH FP data frames having this CFN from all links are not completely collected, then continue waiting and no processing is performed.

The fourth step, if data of all links are not completely collected during the time exceeding the current waiting time of macro diversity combining, then it is judged that the waiting time for RNC macro diversity combining expires, and subsequent processing may be performed on combined data from other links and an indicator value of expiration is set:

IsUIMacCombTimerOut=1.

With reference to FIG. 3, it depicts the specific flow of the processing flow, including the following steps.

The first step: a next data frame is received and whether the frame is a data frame previously uncombined due to expiration of the waiting time is judged, if not, then the frame is directly delivered to the judging flow for subsequent processing.

The second step: if the frame is a data frame previously uncombined due to expiration of the waiting time, then processing is performed according to whether an RNC link is in a macro diversity combining waiting time expired state, and if the RNC link is not in the macro diversity combining waiting time expired state (IsUIMacCombTimerOut=0), then the frame is simply discarded and not processed.

The third step: if the frame is a data frame previously uncombined due to expiration of the waiting time, and the RNC link is in the macro diversity combining waiting time expired state (IsUIMacCombTimerOut=1), then the CFN of the frame is recorded, and a receiving moment is recorded as RecvTick, and cyclic traversing is performed on FP frames having the same DCH from other links at the moment, and uplink receiving moments ArriveTick of the data having this CFN saved in uplink cache of said other links are searched, and difference values TickOffset=RecvTick−ArriveTick between each of the uplink receiving moments and the receiving moment recorded just now is calculated, and a greatest difference value in the calculated difference values Max TickOffset is updated to serve as a new waiting time of the macro diversity combining, recorded as New_UIMacroCombWaitTime.

It is noted that in the present embodiment, an operation of rounding up according to 5 ms is likewise needed here.

The fourth step: the frame is finally discarded, and an RNC link state is updated to be a macro diversity waiting timing unexpired state at the moment, and an indicator value of expiration is provided:

IsUIMacCombTimerOut=0.

Figure 4:
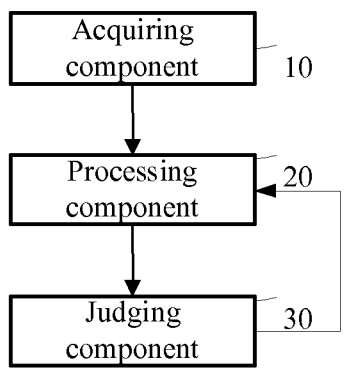
FIG. 4 is a structural schematic diagram of a device for dynamically adjusting waiting time of the uplink macro diversity combining in an embodiment of the disclosure.

An embodiment of the disclosure further provides a device for dynamically adjusting waiting time of the uplink macro diversity combining, and with reference to what is shown in FIG. 4, it includes:

an acquiring component 10, configured to acquire an uplink DCH FP data frame from a current link; and a processing component 20, configured to judge whether the acquired FP data frame is a data frame uncombined due to the expiration of the waiting time of the macro diversity combining, and if the FP data frame is a data frame uncombined due to the expiration of the waiting time, then further judge whether an RNC is in a macro diversity combining waiting time expired state at the moment of receiving the FP data frame, and if the RNC is in the macro diversity combining waiting time expired state at the moment of receiving the FP data frame, then record the CFN and a receiving moment of the FP data frame, perform cyclic traversal on FP data frames of the same DCH from other links, acquire uplink receiving moments of the FP data frames which have the same CFN and are stored in uplink cache of said other links, and calculate difference values between each of the found uplink receiving moments and the recorded receiving moment of the frame, and update a greatest difference value in the calculated difference values to serve as a new waiting time of the macro diversity combining.

In an example embodiment, the processing component 20 is further configured to discard the FP data frame after updating the greatest difference value to serve as the new waiting time of the macro diversity combining, and update a current RNC link state to be a macro diversity waiting timing unexpired state.

In an example embodiment, if the acquired FP data frame is not a data frame uncombined due to the expiration of the waiting time of the macro diversity combining, the processing component 20 is further configured to directly deliver the frame to a judging component 30 for subsequent processing; and if the acquired FP data frame is a data frame uncombined due to the expiration of the waiting time of the macro diversity combining, but the RNC is not in a macro diversity combining waiting time expired state at the moment of receiving the FP data frame, and the processing component 20 is further configured to discard the frame.

In an example embodiment, the device for dynamically adjusting waiting time of uplink macro diversity combining further includes:

a judging component 30, configured to acquire an uplink DCH FP data frame having a certain CFN delivered from the processing component 20 and judge whether it is the first time to receive an FP data frame having this CFN, and if it is the first time to receive an FP data frame having this CFN, then record the moment for receiving the FP data frame for the first time, otherwise calculate a time difference between the current receiving moment and the moment for receiving the FP data frame for the first time; and further configured to judge whether all DCH FP data frames having the CFN from all links in the uplink macro diversity have been completely collected, and if all the DCH FP data frames having the CFN from all the links in the uplink macro diversity have been completely collected, then update a time difference between a moment for receiving a DCH FP data frame for the last time and a moment for receiving a DCH FP data frame for the first time to serve as a new waiting time of the macro diversity combining.

In an example embodiment, if the DCH FP data frames having the CFN from all the links in the uplink macro diversity are not completely collected, the judging component 30 is further configured to continue waiting for FP data frames having the CFN from other links.

In an example embodiment, if data of all the links are not completely collected when the current waiting time of the macro diversity combining expires after the first uplink DCH FP data frame having a certain CFN arrives, the judging component 30 is further configured to mark that an RNC link has been in a macro diversity combining waiting time expired state.

Any equivalent replacements of the structure or the flow based on the contents of the specification and drawings of the disclosure, or direct or indirect application of the equivalent replacements in other related technical fields shall fall within the scope of protection of the disclosure.

INDUSTRIAL APPLICABILITY

The technical solution of the embodiments of the disclosure may be applied to the field of wideband code division multiple access systems, which solves the problem that the existing waiting time of macro diversity is set to be a fixed single value and that integrity of combined data of macro diversity and quick completion of the entire flow cannot be both satisfied.

What is claimed is:

1. A method for dynamically adjusting waiting time of uplink macro diversity combining, comprising:

acquiring an uplink dedicated channel (DCH) frame protocol (FP) data frame from a current link;

judging whether the acquired FP data frame is a data frame uncombined due to expiration of the waiting time of the macro diversity combining, and if the FP data frame is a data frame uncombined due to the expiration of the waiting time, then further judging whether a radio network controller (RNC) is in a macro diversity combining waiting time expired state at a moment of receiving the FP data frame, and if the RNC is in the macro diversity combining waiting time expired state at the moment of receiving the FP data frame, then recording a connection frame number (CFN) and a receiving moment of the FP data frame, performing cyclic traversal on FP data frames of the same DCH from other links, searching for uplink receiving moments of FP data frames which have the same CFN and are stored in uplink cache of said other links, calculating difference values between each of the found uplink receiving moments and the recorded receiving moment, and updating a greatest difference value in the calculated difference values to serve as a new waiting time of the macro diversity combining.

2. The method for dynamically adjusting waiting time of uplink macro diversity combining according to claim 1, further comprising:
   discarding the FP data frame, and updating a current RNC link state to be a macro diversity waiting timing unexpired state.

3. The method for dynamically adjusting waiting time of uplink macro diversity combining according to claim 2, wherein the method further comprises a judging flow, and the judging flow comprises:
   acquiring an uplink DCH FP data frame having a certain CFN delivered from a processing flow, and judging whether it is the first time to receive an FP data frame having this CFN, and if it is the first time to receive an FP data frame having this CFN, then recording a moment for receiving the FP data frame for the first time, otherwise calculating a time difference between a current receiving moment and the moment for receiving the FP data frame for the first time; and
   judging whether all DCH FP data frames having the CFN from all links in the uplink macro diversity have been completely collected, and if all the DCH FP data frames having the CFN from all the links in the uplink macro diversity have been completely collected, then updating a time difference between a moment for receiving a DCH FP data frame for the last time and a moment for receiving a DCH FP data frame for the first time to serve as a new waiting time of the macro diversity combining.

4. The method for dynamically adjusting waiting time of uplink macro diversity combining according to claim 3, wherein the judging flow further comprises:
   if the DCH FP data frames having the CFN from all the links in the uplink macro diversity are not completely collected, then continuing waiting for FP data frames having the CFN from other links.

5. The method for dynamically adjusting waiting time of uplink macro diversity combining according to claim 1, wherein in a processing flow, if the acquired FP data frame is not a data frame uncombined due to the expiration of the waiting time of the macro diversity combining, then the FP data frame is delivered to a judging flow for subsequent processing; and
   if the acquired FP data frame is a data frame uncombined due to the expiration of the waiting time of the macro diversity combining, but the RNC is not in the macro diversity combining waiting time expired state at the moment of receiving the FP data frame, then the FP data frame is discarded.

6. The method for dynamically adjusting waiting time of uplink macro diversity combining according to claim 5, wherein the method further comprises a judging flow, and the judging flow comprises:
   acquiring an uplink DCH FP data frame having a certain CFN delivered from a processing flow, and judging whether it is the first time to receive an FP data frame having this CFN, and if it is the first time to receive an FP data frame having this CFN, recording a moment for receiving the FP data frame for the first time, otherwise calculating a time difference between a current receiving moment and the moment for receiving the FP data frame for the first time; and
   judging whether all DCH FP data frames having the CFN from all links in the uplink macro diversity have been completely collected, and if all the DCH FP data frames having the CFN from all the links in the uplink macro diversity have been completely collected, then updating a time difference between a moment for receiving a DCH FP data frame for the last time and a moment for receiving a DCH FP data frame for the first time to serve as a new waiting time of the macro diversity combining.

7. The method for dynamically adjusting waiting time of uplink macro diversity combining according to claim 6, wherein the judging flow further comprises:
   if the DCH FP data frames having the CFN from all the links in the uplink macro diversity are not completely collected, then continuing waiting for FP data frames having the CFN from other links.

8. The method for dynamically adjusting waiting time of uplink macro diversity combining according to claim 7, wherein the judging flow further comprises:
   if data of all the links are not completely collected when the current waiting time of the macro diversity combining expires after the first uplink DCH FP data frame having a certain CFN arrives, then marking that an RNC link has been in a macro diversity combining waiting time expired state.

9. The method for dynamically adjusting waiting time of uplink macro diversity combining according to claim 1, wherein the method further comprises a judging flow, and the judging flow comprises:
   acquiring an uplink DCH FP data frame having a certain CFN delivered from a processing flow, and judging whether it is the first time to receive an FP data frame having this CFN, and if it is the first time to receive an FP data frame having this CFN, then recording a moment for receiving the FP data frame for the first time, otherwise calculating a time difference between a current receiving moment and the moment for receiving the FP data frame for the first time; and
   judging whether all DCH FP data frames having the CFN from all links in the uplink macro diversity have been completely collected, and if all the DCH FP data frames having the CFN from all the links in the uplink macro diversity have been completely collected, then updating a time difference between a moment for receiving a DCH FP data frame for the last time and a moment for receiving a DCH FP data frame for the first time to serve as a new waiting time of the macro diversity combining.

10. The method for dynamically adjusting waiting time of uplink macro diversity combining according to claim 9, wherein the judging flow further comprises:
    if the DCH FP data frames having the CFN from all the links in the uplink macro diversity are not completely collected, then continuing waiting for FP data frames having the CFN from other links.

11. The method for dynamically adjusting waiting time of uplink macro diversity combining according to claim 10, wherein the judging flow further comprises:
    if data of all the links are not completely collected when the current waiting time of the macro diversity combining expires after the first uplink DCH FP data frame having a certain CFN arrives, then-marking that an RNC link has been in a macro diversity combining waiting time expired state.

12. The method for dynamically adjusting waiting time of uplink macro diversity combining according to claim 9, wherein the judging flow further comprises:
    if data of all the links are not completely collected when the current waiting time of the macro diversity combining expires after the first uplink DCH FP data frame having a certain CFN arrives, then marking that an RNC link has been in a macro diversity combining waiting time expired state.

13. A device for dynamically adjusting waiting time of uplink macro diversity combining, comprising:
a memory storing computer executable instructions, and a hardware processor configured to execute the computer executable instructions stored in the memory, wherein the computer executable instructions comprise:
an acquiring component, connected with a processing component and configured to acquire an uplink dedicated channel (DCH) frame protocol (FP) data frame from a current link; and
the processing component, connected with the acquiring component and configured to judge whether the acquired FP data frame is a data frame uncombined due to expiration of the waiting time of the macro diversity combining, judge whether an RNC is in a macro diversity combining waiting time expired state at a moment of receiving the FP data frame, when the FP data frame is a data frame uncombined due to the expiration of the waiting time, record a connection frame number (CFN) and a receiving moment of the FP data frame when the RNC is in the macro diversity combining waiting time expired state at the moment of receiving the FP data frame, perform cyclic traversal on FP data frames of the same DCH from other links, search for uplink receiving moments of FP data frames which have the same CFN and are stored in uplink cache of said other links, calculate difference values between each of the found uplink receiving moments and the recorded receiving moment, and update a greatest difference value in the calculated difference values to serve as a new waiting time of the macro diversity combining.

14. The device of claim 13, wherein the processing component is further configured to discard the FP data frame after updating the greatest difference value to serve as the new waiting time of the macro diversity combining, and update a current RNC link state to be a macro diversity waiting timing unexpired state.

15. The device of claim 14, further comprising:
a judging component, connected with the processing component and configured to acquire an uplink DCH FP data frame having a certain CFN delivered from the processing component and judge whether it is the first time to receive an FP data frame having this CFN, record a moment for receiving the FP data frame for the first time, when it is the first time to receive an FP data frame having this CFN, calculate a time difference between a current receiving moment and the moment for receiving the FP data frame for the first time, when it is not the first time to receive an FP data frame having this CFN; judge whether all DCH FP data frames having the CFN from all links in the uplink macro diversity have been completely collected, and update a time difference between a moment for receiving a DCH FP data frame for the last time and a moment for receiving a DCH FP data frame for the first time to serve as a new waiting time of the macro diversity combining, when all the DCH FP data frames having the CFN from all the links in the uplink macro diversity have been completely collected.

16. The device of claim 13, wherein the processing component is further configured to directly deliver the frame to a judging component for subsequent processing, when the acquired FP data frame is not a data frame uncombined due to the expiration of the waiting time of the macro diversity combining; and
the processing component is further configured to discard the FP data frame, when the acquired FP data frame is a data frame uncombined due to the expiration of the waiting time of the macro diversity combining, and the RNC is not in the macro diversity combining waiting time expired state at the moment of receiving the FP data frame.

17. The device of claim 16, further comprising:
a judging component, connected with the processing component and configured to acquire an uplink DCH FP data frame having a certain CFN delivered from the processing component, judge whether it is the first time to receive an FP data frame having this CFN, record a moment for receiving the FP data frame for the first time, when it is the first time to receive an FP data frame having this CFN, calculate a time difference between a current receiving moment and the moment for receiving the FP data frame for the first time, when it is not the first time to receive an FP data frame having this CFN, judge whether all DCH FP data frames having the CFN from all links in the uplink macro diversity have been completely collected, and update a time difference between a moment for receiving a DCH FP data frame for the last time and a moment for receiving a DCH FP data frame for the first time to serve as a new waiting time of the macro diversity combining, when all the DCH FP data frames having the CFN from all the links in the uplink macro diversity have been completely collected.

18. The device of claim 13, further comprising:
a judging component, connected with the processing component and configured to acquire an uplink DCH FP data frame having a certain CFN delivered from the processing component and judge whether it is the first time to receive an FP data frame having this CFN, record a moment for receiving the FP data frame for the first time, when it is the first time to receive an FP data frame having this CFN, calculate a time difference between a current receiving moment and the moment for receiving the FP data frame for the first time, when it is not the first time to receive an FP data frame having this CFN; judge whether all DCH FP data frames having the CFN from all links in the uplink macro diversity have been completely collected, and update a time difference between a moment for receiving a DCH FP data frame for the last time and a moment for receiving a DCH FP data frame for the first time to serve as a new waiting time of the macro diversity combining, when all the DCH FP data frames having the CFN from all the links in the uplink macro diversity have been completely collected.

19. The device of claim 13, wherein the judging component is further configured to continue waiting for FP data frames having the CFN from other links, when the DCH FP data frames having the CFN from all the links in the uplink macro diversity are not completely collected.

20. The device of claim 13, wherein the judging component is further configured to mark that an RNC link has been in a macro diversity combining waiting time expired state, when data of all the links are not completely collected when the current waiting time of the macro diversity combining expires after the first uplink DCH FP data frame having a certain CFN arrives.

* * * * *